(12) United States Patent
Allen

(10) Patent No.: X3653
(45) Date of Patent: Feb. 8, 1823

(54) WATER WHEEL

(76) Inventor: Adolphus Allen

Adolphus [illegible]

[illegible]

The Schedule referred to in the foregoing [illegible] and making
a part of the same are in the words following to wit ——
—— This wheel is designed more particularly for large sluggish
streams when there is but little fall of water but is applicable to any
stream or any amount of fall and may be used in tide water to
act and react with both ebb and flood tide and may adapted
to any required angle of altitude from a vertical to a longitudinal
position. It may be composed of wood, of iron or any other
suitable material and is constructed as follows. Take a shaft of
size proportioned to the use intended: after securing a gudgeon
in each end draw a line circumvallating the shaft. lay this off
in eight equal parts (more or less according to the size of the
wheel): from these points draw parallel lines in a line with
the shaft. At each of these points raise a perpendicular to
the contemplated size of the wheel. Extend an oblique line
from the top of the first perpendicular guide crossing the
next parallel line at an angle of seventy two degrees or
eighteen degrees with the radius. Extend it to the second
parallel line. At the intersection raise a perpendicular
equal in length with the first. Extend this oblique curve-
linear line between the top of these guide posts which
will form the contour or periphery of the bucket. The bucket
can then be shaped to fit this form and configuration
and secured to the shaft. At the periphery of each bucket
a projection or flange can extend out to retain the impulse
of the water. The other buckets can be shaped to correspond
with this and all permanently secured to the shaft. This
wheel revolves in a concave or semi circle fitted to the size and shape of the wheel. At one end of the shaft secure a bevel gear ed coupling to carry the power to machinery. What I claim as my improvement and desire to secure by Letters Patent is the spiral form of bucket whereby an oblique action of the water at an angle of seventy two degrees with the shaft, or 18 degrees with the radius of the wheel derives a maximum power from the impulse of the water.

Nathl Allen
Howard Spaulding

Adolphus Allen

Received and recorded March 29th 1854 from a copy of the original sworn to by the Patentee

DRAFTSMAN'S DIVISION.

*All communications should be addressed to*
"The Commissioner of Patents,
Washington, D. C."

2—328 a.

*DEPARTMENT OF THE INTERIOR,*

United States Patent Office,

*Washington, D. C.,* ______________, *189*__

*SIR:*

*The printed* copies of *of Patent No.* A. Allen
are *exhausted.* Feb 8, 1823

*As soon as printed a copy will be mailed you to complete your order.*

*By direction of the Commissioner:*

*Very respectfully,*

*Chief Clerk.*

3143b6-97-5m